United States Patent
Kondo et al.

(10) Patent No.: US 12,502,345 B2
(45) Date of Patent: *Dec. 23, 2025

(54) COSMETIC

(71) Applicant: Dow Toray Co., Ltd., Tokyo (JP)

(72) Inventors: Junya Kondo, Tokyo (JP); Son Thanh Phan, Ichihara (JP); Jun Miyano, Tokyo (JP); Yasue Kanzaki, Ichihara (JP); Seiji Hori, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 796 days.

This patent is subject to a terminal disclaimer.

(21) Appl. No.: 17/268,061

(22) PCT Filed: Jul. 31, 2019

(86) PCT No.: PCT/JP2019/029937
§ 371 (c)(1),
(2) Date: Apr. 25, 2021

(87) PCT Pub. No.: WO2020/036063
PCT Pub. Date: Feb. 20, 2020

(65) Prior Publication Data
US 2021/0244641 A1    Aug. 12, 2021

(30) Foreign Application Priority Data
Aug. 15, 2018   (JP) .................. 2018-152813

(51) Int. Cl.
*A61K 8/58* (2006.01)
*A61K 8/06* (2006.01)
*A61K 8/19* (2006.01)
*A61K 8/25* (2006.01)
*A61K 8/27* (2006.01)
*A61K 8/29* (2006.01)
*A61K 8/34* (2006.01)
*A61K 8/37* (2006.01)
*A61K 8/49* (2006.01)
*A61K 8/894* (2006.01)
*A61Q 17/04* (2006.01)
*A61Q 1/04* (2006.01)
*A61Q 1/06* (2006.01)
*A61Q 1/10* (2006.01)

(52) U.S. Cl.
CPC .............. *A61K 8/585* (2013.01); *A61K 8/064* (2013.01); *A61K 8/19* (2013.01); *A61K 8/25* (2013.01); *A61K 8/27* (2013.01); *A61K 8/29* (2013.01); *A61K 8/345* (2013.01); *A61K 8/37* (2013.01); *A61K 8/375* (2013.01); *A61K 8/4993* (2013.01); *A61K 8/894* (2013.01); *A61Q 17/04* (2013.01); *A61Q 1/04* (2013.01); *A61Q 1/06* (2013.01); *A61Q 1/10* (2013.01)

(58) Field of Classification Search
None
See application file for complete search history.

(56) References Cited

U.S. PATENT DOCUMENTS

| | | | |
|---|---|---|---|
| 4,501,619 A | 2/1985 | Gee | |
| 4,744,978 A | 5/1988 | Homan et al. | |
| 4,844,888 A * | 7/1989 | Zawadzki | A61K 8/893 524/588 |
| 4,980,167 A | 12/1990 | Harashima et al. | |
| 5,596,061 A | 1/1997 | Berger et al. | |
| 5,628,989 A | 5/1997 | Harashima et al. | |
| 5,643,380 A | 7/1997 | Saitoh et al. | |
| 5,939,478 A | 8/1999 | Beck et al. | |
| 5,948,391 A | 9/1999 | O'Lenick, Jr. | |
| 6,238,656 B1 | 5/2001 | Morita et al. | |
| 6,290,941 B1 | 9/2001 | Lahanas et al. | |
| 6,342,209 B1 | 1/2002 | Patil et al. | |
| 6,384,104 B1 | 5/2002 | Chang et al. | |
| 7,981,405 B2 * | 7/2011 | Ueyama | A61K 8/34 424/401 |
| 8,500,900 B2 | 8/2013 | Sugiura et al. | |
| 8,900,553 B2 * | 12/2014 | Tamarkin | A61K 9/122 514/871 |
| 8,956,449 B2 | 2/2015 | Kojima et al. | |
| 9,486,652 B2 | 11/2016 | Araki et al. | |
| 10,130,579 B2 | 11/2018 | Kanaya et al. | |
| 12,023,403 B2 | 7/2024 | Kanzaki et al. | |

(Continued)

FOREIGN PATENT DOCUMENTS

| | | |
|---|---|---|
| CN | 104125973 A | 10/2014 |
| EP | 2997956 A1 | 3/2016 |

(Continued)

OTHER PUBLICATIONS

Cassiday www.aocs.org/stay-informed/inform-magazine/featured-articles/emulsions-making-oil-and-water-mix-april-2014?SSO=True# (Year: 2014).*
Machine assisted English Translation of JPH01261316 obtained from https://worldwide.espacenet.com on May 3, 2021, 8 pages.
Machine assisted English Translation of JPH1143417 obtained from https://worldwide.espacenet.com on May 4, 2021, 13 pages.
Machine assisted English Translation of JP2002293726 obtained from https://worldwide.espacenet.com on May 3, 2021, 22 pages.
Machine assisted English Translation of JP2004091423 obtained from https://worldwide.espacenet.com on May 3, 2021, 14 pages.
Machine assisted English Translation of JP2011073971 obtained from https://worldwide.espacenet.com on May 3, 2021, 17 pages.
Machine assisted English Translation of JP2013177370 obtained from https://worldwide.espacenet.com on May 3, 2021, 18 pages.

(Continued)

*Primary Examiner* — Melissa S Mercier
*Assistant Examiner* — Caralynne E Helm
(74) *Attorney, Agent, or Firm* — Warner Norcross + Judd LLP

(57) ABSTRACT

A cosmetic composition is provided. The cosmetic composition comprises a carboxylic acid modified silicone (A) that has a specific chemical structure and is liquid at room temperature. The cosmetic composition also comprises an oil agent (B). The cosmetic composition generally provides a cosmetic film having excellent water resistance, and can be easily removed by normal soap and water.

17 Claims, No Drawings

(56) References Cited

U.S. PATENT DOCUMENTS

| | | | |
|---|---|---|---|
| 2002/0031488 A1 | 3/2002 | Kanji et al. | |
| 2003/0212232 A1 | 11/2003 | Majeti et al. | |
| 2009/0253885 A1 | 10/2009 | Kamei | |
| 2010/0189676 A1* | 7/2010 | Matsuzawa | A61K 8/375 514/63 |
| 2010/0190871 A1 | 7/2010 | Araki et al. | |
| 2010/0216744 A1* | 8/2010 | Mizutani | A61K 8/042 514/63 |
| 2010/0317555 A1 | 12/2010 | Araki et al. | |
| 2011/0182846 A1 | 7/2011 | Ikeda et al. | |
| 2012/0040931 A1 | 2/2012 | Kamei | |
| 2012/0251605 A1 | 10/2012 | Iimura et al. | |
| 2012/0263662 A1 | 10/2012 | Iimura et al. | |
| 2014/0199251 A1 | 7/2014 | Ashida et al. | |
| 2014/0235732 A1* | 8/2014 | Ibe | A61K 8/342 514/772 |
| 2014/0255323 A1 | 9/2014 | Ishida et al. | |
| 2014/0348765 A1 | 11/2014 | Sasaki | |
| 2015/0011656 A1 | 1/2015 | Tamura et al. | |
| 2015/0157546 A1 | 6/2015 | Naoi | |
| 2015/0174054 A1 | 6/2015 | Chiou et al. | |
| 2015/0216787 A1 | 8/2015 | Hori et al. | |
| 2015/0232601 A1 | 8/2015 | Furukawa et al. | |
| 2016/0120786 A1 | 5/2016 | Halpern Chirch et al. | |
| 2017/0035681 A1 | 2/2017 | Kanaya et al. | |
| 2017/0304658 A1 | 10/2017 | Roudot et al. | |
| 2018/0215877 A1 | 8/2018 | Hori et al. | |
| 2018/0263883 A1 | 9/2018 | Uyama et al. | |
| 2019/0053999 A1 | 2/2019 | Hori et al. | |
| 2019/0144612 A1 | 5/2019 | Hori et al. | |
| 2019/0231674 A1 | 8/2019 | Furukawa et al. | |
| 2021/0244641 A1 | 8/2021 | Kondo et al. | |
| 2021/0322296 A1 | 10/2021 | Kikunaga et al. | |
| 2021/0330559 A1 | 10/2021 | Kondo et al. | |
| 2021/0330571 A1 | 10/2021 | Kanzaki et al. | |
| 2022/0183955 A1 | 6/2022 | Kondo et al. | |
| 2022/0183956 A1 | 6/2022 | Kondo et al. | |
| 2022/0257497 A1 | 8/2022 | Kanzaki et al. | |

FOREIGN PATENT DOCUMENTS

| | | | |
|---|---|---|---|
| EP | 3132789 A1 | 2/2017 | |
| EP | 3213742 A1 | 9/2017 | |
| EP | 3327064 A1 | 5/2018 | |
| EP | 3838249 A1 | 6/2021 | |
| EP | 3838255 A1 | 6/2021 | |
| EP | 3838256 A1 | 6/2021 | |
| JP | S62103007 A | 5/1987 | |
| JP | H01261316 A | 10/1989 | |
| JP | H02243612 A | 9/1990 | |
| JP | H0812545 A | 1/1996 | |
| JP | H0844260 A | 2/1996 | |
| JP | H08109263 A | 4/1996 | |
| JP | H08157335 A * | 6/1996 | |
| JP | H0959125 A * | 3/1997 | |
| JP | H1143417 A | 2/1999 | |
| JP | H11504665 A | 4/1999 | |
| JP | H11193331 A | 7/1999 | |
| JP | 2000281523 A | 10/2000 | |
| JP | 2001172463 A | 6/2001 | |
| JP | 2002146188 A * | 5/2002 | |
| JP | 2002146189 A * | 5/2002 | |
| JP | 2002275265 A * | 9/2002 | |
| JP | 2002293726 A | 10/2002 | |
| JP | 2002322015 A * | 11/2002 | |
| JP | 2004026669 A | 1/2004 | |
| JP | 2004091423 A | 3/2004 | |
| JP | 2005524747 A | 8/2005 | |
| JP | 2007277415 A | 10/2007 | |
| JP | 2009185144 A | 8/2009 | |
| JP | 2009263643 A | 11/2009 | |
| JP | 2010138074 A | 6/2010 | |
| JP | 2011073971 A | 4/2011 | |
| JP | 2011148784 A | 8/2011 | |
| JP | 2011149017 A | 8/2011 | |
| JP | 2012036348 A | 2/2012 | |
| JP | 2013121947 A | 6/2013 | |
| JP | 2013144655 A | 7/2013 | |
| JP | 2013177370 A | 9/2013 | |
| JP | 2014040511 A | 3/2014 | |
| JP | 2014040512 A | 3/2014 | |
| JP | 2014201569 A | 10/2014 | |
| JP | 2015203026 A | 11/2015 | |
| JP | 2016185932 A | 10/2016 | |
| JP | 2017178930 A | 10/2017 | |
| JP | 2018024881 | 2/2018 | |
| JP | 2018115211 A | 7/2018 | |
| WO | WO-9523579 A2 * | 9/1995 | A61K 8/893 |
| WO | 2009022621 A1 | 2/2009 | |
| WO | 2009025146 A1 | 2/2009 | |
| WO | 2012070309 A1 | 5/2012 | |
| WO | 2013061776 A1 | 5/2013 | |
| WO | 2013100177 A1 | 7/2013 | |
| WO | 2013108515 A1 | 7/2013 | |
| WO | 2013115099 A1 | 8/2013 | |
| WO | 2014185316 A1 | 11/2014 | |
| WO | 2015125332 A1 | 8/2015 | |
| WO | 2017018358 A1 | 2/2017 | |
| WO | 2017061090 A1 | 4/2017 | |
| WO | 2017191798 A1 | 11/2017 | |
| WO | 2018066559 A1 | 4/2018 | |
| WO | 2020036061 A1 | 2/2020 | |
| WO | 2020036062 A1 | 2/2020 | |
| WO | 2020036063 A1 | 2/2020 | |
| WO | 2020036064 A1 | 2/2020 | |
| WO | 2020036065 A1 | 2/2020 | |

OTHER PUBLICATIONS

Machine assisted English Translation of JP2014201569 obtained from https://worldwide.espacenet.com on May 3, 2021, 25 pages.
Machine assisted English Translation of JP2018115211 obtained from https://worldwide.espacenet.com on May 3, 2021, 41 pages.
Machine assisted English Translation of WO2013115099 obtained from https://worldwide.espacenet.com on May 3, 2021, 36 pages.
Machine assisted English Translation of WO2020036061 obtained from https://worldwide.espacenet.com on May 3, 2021, 40 pages.
Machine assisted English Translation of WO2020036062 obtained from https://worldwide.espacenet.com on May 3, 2021, 41 pages.
Machine assisted English Translation of WO2020036063 obtained from https://worldwide.espacenet.com on May 3, 2021, 34 pages.
Machine assisted English Translation of WO2020036064 obtained from https://worldwide.espacenet.com on May 3, 2021, 44 pages.
Machine assisted English Translation of WO2020036065 obtained from https://worldwide.espacenet.com on May 3, 2021, 37 pages.
Machine assisted English translation of JP2002146189A obtained from https://patents.google.com/patent on May 26, 2022, 11 pages.
Momentive "SilForm™ INX Fluid"—Marketing Bulletin, obtained from https://www.momentive.com/docs/default-source/productdocuments/silform-inx-fluid/silform-inx-fluid-marketing-bulletin-(1)20956cf16e974c2d9a951e587eee27dc.pdf, 12 pages.
Machine assisted English translation of JP2017178930A obtained from https://patents.google.com/patent on Oct. 26, 2021, 11 pages.
Machine assisted English translation of JP2016185932A obtained from https://patents.google.com/patent on Oct. 26, 2021, 12 pages.
Machine assisted English translation of WO2015125332A1 obtained from https://patents.google.com/patent on Oct. 26, 2021, 11 pages.
PCT/JP2015/060963 International Search Report dated Jul. 14, 2015, 2 pages.
English language abstract and machine translation for JPH0812524(A) extracted from http://worldwide.espacenet.com database on Oct. 25, 2016, 13 pages.
English language abstract and machine translation for JPH0812546 (A) extracted from http://worldwide.espacenet.com database on Oct. 25, 2016, 12 pages.
English language abstract and machine translation for JPH08109263 (A) extracted from http://worldwide.espacenet.com database on Oct. 25, 2016, 24 pages.

(56) References Cited

OTHER PUBLICATIONS

English language abstract and machine translation for JPH09241511 (A) extracted from http://worldwide.espacenet.com database on Oct. 25, 2016, 13 pages.
English language abstract and machine translation for JP2002114849 (A) extracted from http://worldwide.espacenet.com database on Oct. 25, 2016, 10 pages.
English language abstract and machine translation for JP2004026669 (A) extracted from http://worldwide.espacenet.com database on Oct. 25, 2016, 12 pages.
Machine assisted English translation of JP2000281523A obtained from <https://patents.google.com/patent> on Aug. 8, 2024, 16 pages.
K. Kageshima et al., Fragrance Journal, Special Issue Nov. 19, 2005, p. 125-130, abstract only.
English language abstract for JP2010138074 (A) extracted from http://worldwide.espacenet.com database on Oct. 25, 2016 and machine translation extracted from https://patents.google.com database on Jan. 13, 2017, 20 pages.
English language abstract and machine translation for JP2007277415 (A) extracted from http://worldwide.espacenet.com database on Jun. 4, 2018, 29 pages.
Machine assisted English translation of WO2012070309A1 obtained from https://patents.google.com/patent on Aug. 8, 2024, 8 pages.
English translation of International Search Report for PCT/JP2019/029957 dated Oct. 8, 2019, 2 pages.
Momentive: "Silform INX fluid", Internet Citation, Feb. 2, 2015 (Feb. 2, 2015), XP002785508, Retrieved from the Internet: URL:http://www.essentialingredients.com/pdf/SilFormINXmarketingbrochure.pdf.
Database GNPD [Online] MINTEL; Oct. 29, 2012 (Oct. 29, 2012), anonymous: "Cream+", XP055907992, Database accession No. 1900229.
Database GNPD [Online] MINTEL; Apr. 22, 2016 (Apr. 22, 2016), anonymous: "Ultra Sun Protection Cream SPF 50+", XP055908000, Database accession No. 3945269.
Database GNPD [Online] MINTEL; Apr. 26, 2010 (Apr. 26, 2010), anonymous: "Skin Empowering Cream", XP055907993, Database accession No. 1323504.
Database GNPD [Online] MINTEL; Jan. 28, 2019 (Jan. 28, 2019), anonymous: "Wrinkle Resetter", XP055907996, Database accession No. 6296569.
English Translation of International Search Report for PCT/JP2019/029956, dated Oct. 8, 2019, 2 pages.
Momentive "SilForm? INX Fluid"—Marketing Bulletin, obtained from https://www.momentive.com/docs/default-source/productdocuments/siliform-inx-fluid/silform-inx-fluid-marketing-bulletin-(1).20956cf16e974c2d9a951e587eee27dc.pdf , 12 pages 2017.
English Translation of International Search Report for PCT/JP2019/029937, dated Oct. 21, 2019, 2 pages.
English Translation of International Search Report for PCT/JP2019/029930, dated Oct. 15, 2019, 2 pages.
English Translation of International Search Report for PCT/JP2019/029958, dated Oct. 15, 2019, 1 page.
English Translation of International Search Report for PCT/JP2019/029935, dated Oct. 15, 2019, 2 pages.
International Search Report for PCT/JP2019/029927 dated Oct. 15, 2019, 2 pages.

* cited by examiner

COSMETIC

CROSS-REFERENCE TO RELATED APPLICATIONS

This application is the U.S. National Stage of International Application No. PCT/JP2019/029937 filed on 31 Jul. 2019, which claims priority to and all advantages of Japanese Application No. 2018-152813 filed on 15 Aug. 2018, the content of which is incorporated herein by reference.

TECHNICAL FIELD

The present invention relates to a cosmetic composition capable of providing a cosmetic film that has high water resistance and can be easily washed.

BACKGROUND ART

Cosmetic compositions containing oil agents can provide a cosmetic film with excellent water resistance and thus, are widely used as, for example, sunscreen agents or makeup cosmetic compositions such as foundations, eye shadows, and the like.

Meanwhile, it is difficult to remove the cosmetic film obtained by such cosmetic compositions from the skin or the like by using only water and soap, and typically an oil-based cleansing agent needs to be used. The use of such oily cleansing agents is cumbersome and costs much.

Note that Japanese Unexamined Patent Application Publication No. 2013-144655 describes a water-in-oil emulsion cosmetic composition containing carboxydecyltrisiloxane, however, the purpose of using the carboxydecyl trisiloxane is to suppress a squeaky feeling caused by the hydrophobic powder, improve compatibility with skin, and decrease greasiness. There is no description that the carboxylic acid modified silicone is used to improve removability of the cosmetic film. Japanese Unexamined Patent Application Publication No. 2013-177370 describes a water-in-oil emulsion cosmetic composition and an oil-based cosmetic composition that contain a carboxylic acid modified silicone having a specific structure, however, the purpose of using the specific carboxylic acid modified silicone is to suppress powder squeakiness caused by volatilization of the volatile oil content in the cosmetic composition containing a small amount of nonvolatile oil content and a sufficient amount of powder component. There is no description that the carboxylic acid modified silicone is used to improve removability of the cosmetic film.

RELATED ART DOCUMENTS

Patent Documents

Patent Document 1: Japanese Unexamined Patent Application Publication No. 2013-144655
Patent Document 2: Japanese Unexamined Patent Application Publication No. 2013-177370

SUMMARY OF THE INVENTION

Problem to be Solved by the Invention

An object of the present invention is to provide a cosmetic film with excellent water resistance and to provide a cosmetic composition that can be easily removed using normal soap and water.

Means for Solving the Problem

An object of the present invention can be achieved by a cosmetic composition containing following components:
a carboxylic acid modified silicone (A) that is liquid at room temperature (25° C.) expressed by a following structural formula (1):

[Formula 1]

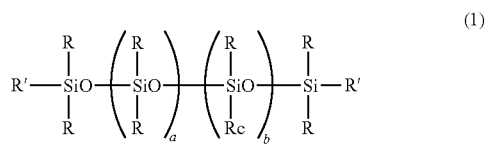

(wherein:
Rc represents a carboxyl group-containing organic group represented as a general formula: $-R^1-(OR^2)p-(O)w-R^3-COOH$ ($R^1$ represents a linear or branched alkylene group having 2 to 22 carbon atoms, $R^2$ is a linear or branched alkylene group having 2 to 4 carbon atoms, $R^3$ represents a bond (—) or a linear or branched alkylene group having 1 to 22 carbon atoms, p represents a number of 0 to 200, and w represents a number of 0 or 1),
R represents a same or different alkyl or alkoxy group, having 1 to 22 carbon atoms, or phenyl group,
R' is Rc or R, and
a is a number of 0 or more, b is a positive number, and a+b is a number in a range of 2 to 30; and
an oil agent (B).
In the structural formula (1), preferably, a and b each are a positive number, a+b is a number in a range of 2 to 20, and a/b is 0.3 to 3.0.

The cosmetic composition of the present invention preferably contains the carboxylic acid modified silicone (A) in a range of 0.1 to 10 mass %.

Note that "mass %" of the present specification is synonymous with "weight %", and is based on the total mass (total weight) of the cosmetic composition of the present invention, unless otherwise specified.

The oil agent (B) preferably contains at least one ultraviolet light absorbing agent.

The cosmetic composition of the present invention preferably contains the oil agent (B) in a range of 5 to 99 mass %.

The cosmetic composition of the present invention preferably further contains an oil-soluble film-forming agent (C).

The cosmetic composition of the present invention preferably further contains a hydrophobic powder (D).

The cosmetic composition of the present invention may further contains water (E). In this case, the cosmetic composition of the present invention is preferably a water-in-oil emulsion cosmetic composition. The cosmetic composition may further contain a surfactant (F). The amount of the surfactant (F) can be set to 0.5 to 15 mass % of the total mass of the cosmetic composition.

Effects of the Invention

The cosmetic composition of the present invention contains the oil agent and thus, can provide a cosmetic film having excellent water resistance and moreover, the cosmetic film can be easily removed by normal soap and water.

In addition, the cosmetic composition of the present invention is stable. Here, "stable" means uniform without causing phase separation over time.

DESCRIPTION OF THE PREFERRED EMBODIMENT

As a result of diligent research, the present inventors found that the use of a carboxylic acid modified silicone that has a specific structure and is liquid at room temperature (25° C.) enables a cosmetic composition that can be easily removed by normal soap and water although it contains an oil agent, and thus, completed the present invention.

In the cosmetic composition of the present invention, when the oil agent contains an ultraviolet light absorbing agent, the sun protection effect is highly sustainable.

When the cosmetic composition of the present invention contains an oil-soluble film-forming agent, water resistance of the obtained cosmetic film can be further increased.

When the cosmetic composition of the present invention contains a hydrophobic powder, water resistance of the obtained cosmetic film can be further increased.

The cosmetic composition of the present invention can include water, and in this case, the water is preferably a discontinuous phase, and the oil agent is preferably a water-in-oil type constituting a continuous phase. On the contrary, the cosmetic composition of the present invention may be anhydrous, and also in this case, the oil agent preferably constitutes a continuous phase.

The cosmetic composition of the present invention will be described below in more detail.

[Carboxylic Acid Modified Silicone]

The cosmetic composition of the present invention is at least one carboxylic acid modified silicone (A) that is liquid at room temperature (25° C.) and has a specific chemical structure. Note that the carboxylic acid modified silicone (A) is preferably liquid at room temperature (25° C.) and at 1 atmosphere.

The carboxylic acid modified silicone (A) is expressed by the following structural formula (1):

[Formula 2]

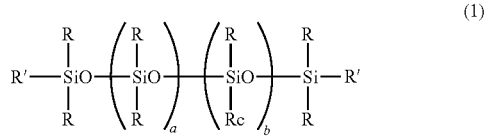

(1)

(wherein:
Rc represents a carboxyl group-containing organic group represented as a general formula: —$R^1$—($OR^2$))p-(O)w-$R^3$—COOH ($R^1$ represents a linear or branched alkylene group having 2 to 22 carbon atoms, $R^2$ is a linear or branched alkylene group having 2 to 4 carbon atoms, $R^3$ represents a bond (—) or a linear or branched alkylene group having 1 to 22 carbon atoms, p represents a number of 0 to 200, and w represents a number of 0 or 1),
R represents a same or different alkyl or alkoxy group, having 1 to 22 carbon atoms, or phenyl group,
R' is Rc or R,
a is a number of 0 or more, b is a positive number, a and b each are preferably a positive number, more preferably a 2, and still more preferably b≥2,
a+b is a number in a range of 2 to 30, preferably 2 to 20, more preferably 2 to 15, and more preferably 2 to 10, and
a/b is preferably in a range of 0.3 to 3.0, more preferably 0.3 to 2.5, still more preferably 0.3 to 2.0, and still more preferably 0.5 to 2.0).

In the structural formula (1), preferably, a and b each are a positive number, a+b is a number in a range of 2 to 20, and a/b is 0.3 to 3.0. a/b is more preferably 0.3 to 2.5, still more preferably 0.3 to 2.0, and still more preferably 0.5 to 2.0.

In the general formula representing the carboxyl group-containing organic group, $R^1$ is a linear or branched alkylene group having 2 to 22 carbon atoms, preferably a linear alkylene group having 2 to 12 carbon atoms, particularly preferably a linear alkylene group having 2 to 10 carbon atoms, and examples thereof include ethylene, propylene, trimethylene, butylene, pentamethylene, hexamethylene, heptamethylene, octamethylene, nonamethylene, decamethylene, undecamethylene, dodecamethylene, tridecamethylene, tetradecamethylene, pentadecamethylene, and hexadecamethylene groups.

Examples of the linear or branched alkylene group having 2 to 4 carbon atoms of $R^2$ include ethylene, propylene, trimethylene and butylene groups, and the ethylene group is particularly preferable.

Examples of the linear or branched alkylene group having 1 to 22 carbon atoms of $R^3$ include methylene, ethylene, ethylethylene, propylene, trimethylene, tetramethylene, pentamethylene, hexamethylene, heptamethylene, octamethylene, nonamethylene, decamethylene, undecamethylene, dodecamethylene, tridecamethylene, tetradecamethylene, pentadecamethylene, and hexadecamethylene groups. Among the same, the groups having the carbon atoms 1 to 12, particularly, the sum of carbon atoms of $R^1$ and $R^3$, of 2 to 22 is preferable.

p represents a number of 0 to 200, preferably 0 to 20, and more preferably 0 to 10. In addition, w represents a number of 0 or 1, but is preferably 0. Note that when both p and w are 0, the carboxyl group-containing organic group is expressed by the structure formula —($C_nH_{2n}$)—COOH, and preferably has a structure in which one carboxyl group is bonded to a silicon atom via a linear or branched alkylene group having 3 to 44 carbon atoms. In the formula, n is a number of 3 to 44, preferably a number of 3 to 20, more preferably a number of 3 to 16.

The carboxylic acid modified silicone (A) is not particularly limited as long as at least one carboxyl group-containing organic group is introduced into a side chain or an end of organosiloxane. Preferably, the carboxyl group-containing organic group is introduced into the side chain of the organosiloxane.

Therefore, as the carboxylic acid modified silicone (A), for example, the silicone main chain is grafted with the carboxyl group-containing organic group as the side chain, the carboxyl group-containing organic group is added to one end of the silicone main chain, the carboxyl group-containing organic group is added to both ends of the silicone main chain, or the carboxyl group-containing organic group is added to both ends of the silicone main chain and the carboxyl group-containing organic group is grafted as the side chain, and optionally, a long chain alkyl group having 6 or more carbon atoms is further included. Most preferably, the silicone main chain is grafted with the carboxyl group-containing organic group as the side chain. Note that, when the carboxylic acid modified silicone has a long chain alkyl group, compounding stability with organic oil agents such as hydrocarbon oil or organic cosmetic raw materials (in particular, ultraviolet light absorbing agent) may be improved.

The carboxylic acid modified silicone expressed by structural formula (1) is preferably a carboxylic acid modified silicone in which R' is R and a carboxyl group-containing organic group expressed by the general formula: —$R^1$—($OR^2$) p-(O)w-$R^3$—COOH is grafted to the silicone side chain, more preferably in which R' is R and the silicone side chain has a plurality of the carboxyl group-containing organic groups, and still more preferably in which R' is R and the silicone side chain has a plurality of the carboxyl group-containing organic groups and a/b=1.

In the structural formula (1), R is preferably a methyl group, an alkoxy group, or a phenyl group, however, from the perspective of compounding stability with an organic oil agent such as hydrocarbon oil or organic cosmetic raw materials (in particular, an ultraviolet light absorbing agent), R may partially have a long chain alkyl group having 6 to 22 carbon atoms.

In the present invention, such carboxylic acid modified silicone can be produced by any known method, for example, a method in which a dimethylpolysiloxane having a Si—H group and an unsaturated carboxylic acid ester compound are subjected to addition reaction under a platinum catalyst, and further saponified into carboxylic acid; a method in which a dimethylpolysiloxane having a Si—H group and an unsaturated carboxylic acid silyl ester or an allyloxycarboxylic acid silyl ester are subjected to addition reaction under a platinum catalyst and after the reaction, are hydrolyzed to obtain a desired object; a method of equilibrating reaction using bis(hydroxycarbonylethyl)tetramethyldisiloxane, cyclic siloxane and an acidic catalyst to obtain a carboxylic acid modified silicone at both ends (Silicone Handbook, edited by Kunio Ito, Nikkan Kogyo Shimbun, pp. 166-167). Furthermore, a product marketed as the trade name ES-5800 Formulation Aid manufactured by Dow Toray Co., Ltd.) is exemplified as the suitable carboxylic acid modified silicone of the present invention.

The cosmetic composition of the present invention preferably contains the carboxylic acid modified silicone (A) in a range of 0.1 to 10 mass % of the total mass of the cosmetic composition, more preferably in a range of 0.5 to 5 mass %, and still more preferably in a range of 1.0 to 3.0 mass %.

The carboxylic acid modified silicone (A) can be dissolved in an oil agent (B) described below. Therefore, like an oil-based cosmetic composition or a water-in-oil cosmetic composition, when the cosmetic composition of the present invention contains an oil phase as a continuous phase, the carboxylic acid modified silicone (A) can be dissolved in the continuous phase (oil phase). In this case, the carboxylic acid modified group of the carboxylic acid modified silicone (A) is preferably unneutralized.

In the present invention, by using the carboxylic acid modified silicone (A) and the oil agent (B) described below, as compared to the case where the component (A) is not used, removability of the cosmetic film obtained using the cosmetic composition is significantly improved. Further, because the carboxylic acid modified silicone (A) that imparts the removability has a carboxylic acid modified group that can be neutralized with a basic substance in the molecule, the cosmetic composition, particularly the cosmetic film formed from the cosmetic composition including an oil phase as a continuous phase, such as an oil-based cosmetic composition or a water-in-oil cosmetic composition, has excellent water resistance and can be easily washed away when the carboxylic acid modified group is neutralized in the presence of normal soap and water.

[Oil Agent]

The cosmetic composition of the present invention includes at least one oil agent (B). The oil agent forms preferably an oil phase, more preferably a continuous phase in the cosmetic composition of the present invention.

The "oil agent" of the present invention is generally used as a component of a cosmetic composition, and is not particularly limited. The oil agent is normally liquid at room temperature, but may be a solid such as a wax, or may be a highly viscous gum or paste shape described below.

The oil agent is preferably at least one liquid at 5 to 100° C. selected from the group consisting of silicone oils, nonpolar organic compounds, and low polarity organic compounds.

Silicone oils are hydrophobic, and their molecular structure may be cyclic, linear, or branched. The viscosities of silicone oils at 25° C. are usually in the range of 0.65 to 100,000 $mm^2$/s, preferably in the range of 0.65 to 10,000 $mm^2$/s.

Silicone oils include, for example, linear organopolysiloxanes, cyclic organopolysiloxanes, and branched organopolysiloxanes. Among these, linear organopolysiloxanes, cyclic organopolysiloxanes, and branched organopolysiloxanes that are volatile are preferable.

More specifically, examples of linear organopolysiloxanes include dimethylpolysiloxane capped at both molecular chain ends with trimethylsiloxy groups (dimethylsilicone having low viscosity such as 2 mPa·s or 6 mPa·s to high viscosity of 1,000,000 mPa·s), organohydrogenpolysiloxane, methylphenylpolysiloxane capped at both molecular chain ends with trimethylsiloxy groups, dimethylsiloxane/methylphenylsiloxane copolymer capped at both molecular chain ends with trimethylsiloxy groups, diphenylpolysiloxane capped at both molecular chain ends with trimethylsiloxy groups, dimethylsiloxane/diphenylsiloxane copolymer capped at both molecular chain ends with trimethylsiloxy groups, trimethylpentaphenyl trisiloxane, phenyl (trimethylsiloxy) siloxane, methyl alkyl polysiloxane capped at both molecular chain ends with trimethylsiloxy groups, dimethylpolysiloxane/methylalkylsiloxane copolymer capped at both molecular chain ends with trimethylsiloxy groups, dimethylsiloxane/methyl (3,3,3-trifluoropropyl) siloxane capped at both molecular chain ends with trimethylsiloxy groups, α,ω-dihydroxypolydimethylsiloxane, α,ω-diethoxypolymethylsiloxane, 1,1,1,3,5,5,5-heptamethyl-3-octyltrisiloxane, 1,1,1,3,5,5,5-heptamethyl-3-dodecyltrisiloxane, 1,1,1,3,5,5,5-heptamethyl-3-hexadecyltrisiloxane, tristrimethylsiloxymethylsilane, tristrimethylsiloxyalkylsilane, tetrakistrimethylsiloxysilane, tetramethyl-1,3-dihydroxydisiloxane, octamethyl-1,7-dihydroxytetrasiloxane, hexamethyl-1,5-diethoxytrisiloxane, hexamethyldisiloxane, octamethyltrisiloxane, higher alkoxy modified silicones, higher fatty acid modified silicones, dimethiconol and the like.

Examples of cyclic organopolysiloxanes include hexamethylcyclotrisiloxane (D3), octamethylcyclotetrasiloxane (D4), decamethylcyclopentasiloxane (D5), dodecamethylcyclotetrasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl) trimethylcyclotrisiloxane, 1,3,5,7-tetra(3-methacryloxypropyl)tetramethylcyclotetrasiloxane, 1,3,5,7- tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclo-tetrasiloxane, 1,3,5,7-tetra(N-acryloyl-N-methyl-3-aminopropyl)tetramethylcyclotetrasiloxane, 1,3,5,7-tetra(N,N-bis(lauroyl)-3-aminopropyl) tetramethylcyclotetrasiloxane, and the like.

Examples of the branched organopolysiloxane include methyltristrimethylsiloxysilane, ethyltristrimethylsiloxysilane, propyltristrimethylsiloxysilane, tetrakistrimethylsiloxysilane, and phenyltristrimethylsiloxysilane.

As the nonpolar organic compound and the low polarity organic compound, a hydrocarbon oil and a fatty acid ester oil are preferable. These are components which are widely used, in particular, as substrates for make-up cosmetic compositions.

Examples of the hydrocarbon oil include liquid paraffin, light liquid isoparaffin, heavy liquid isoparaffin, petrolatum, n-paraffin, isoparaffin, isododecane, isohexadecane, polyisobutylene, hydrogenated polyisobutylene, polybutene, ozokerite, ceresin, microcrystalline wax, paraffin wax, polyethylene wax, polyethylene polypropylene wax, scralan, squalene, pristane, polyisoprene, and the like.

Examples of the fatty acid ester oil include hexyl decyl octanate, cetyl octanate, isopropyl myristate, isopropyl palmitate, butyl stearate, hexyl laurate, myristyl myristate, oleyl oleate, decyl oleate, and octyldodecyl myristate. Hexyldecyl dimethyloctanoate, cetyl lactate, myristyl lactate, diethyl phthalate, dibutyl phthalate, lanolin acetate, propylene glycol diioylate, glyceryl tri2-ethylhexanoate, trimethylpropane tri-2-ethylhexanoate, ditriethylhexanoate Methylol propane, (isostearic acid/sebacic acid) ditrimethylol propane, trimethylol propane trioctanoate, trimethylol propane triisostearate, diisopropyl adipate, diisobutyl adipate, 2-hexyldecyl adipate, di-2-heptylune adipate decyl, diisostearyl malate, hydrogenated castor oil monoisostearate, octyldodecyl isostearate, isopropyl isostearate, isosetyl isostearate, ethylene glycol di-2-ethylhexanoate, cetyl 2-ethylhexanoate, tetra-2-pentaerythritol ethylhexanoate, octyldodecyl gum ester, ethyl oleate, octyldodecyl oleate, neopentyl glycol dicaprate, triethyl citrate, 2-ethylhexyl succinate, dioctyl succinate, isosetyl stearate, diisopropyl sebacate, sebacic acid di-2-ethylhexyl, diethyl sebacate, dioctyl sebacate, dibutyl octyl sebacate, cetyl parimitinate, octyldodecyl palmitate, octyl palmitate, 2-ethylhexyl palmitate, 2-hexyldecyl palmitate, 2-heptyl palmitate undecyl, cholesteryl 12-hydroxystearyl acid, dipentaerythritol fatty acid ester, 2-hexyldecyl myristate, ethyl laurate, N-lauroyl-L-glutamic acid-2-octyldodecyl ester, N-lauroyl-L-glutamate di(cholesteryl/behenyl/octyldodecyl), N-lauroyl-L-glutamate (cholesteryl/octyldodecyl), N-lauroyl-L-glutamate (phytosteryl/behenyl/octyldodecyl), N-lauroyl-L-glutamate di(phytosteryl/octyldodecyl), N-lauroyl sarcosin isopropyl, diisostearyl malate, neopentyl glycol dioctanoate, isodecyl neopentate, isotridecyl neopentanoate, isostearyl neopentate, isononane Isononyl acid, isotridecyl isononanoate, octyl isononanoate, isotridecyl isononanoate, diethylpentanediol dineopenate, methylpentanediol dineopenate, octyldodecyl neodecanoate, 2-butyl-2-ethyl-1,3-propanediol dioctanoate, tetra pentaerythrityl octanate, hydrogenated rosin pentaerythricyl, pentaerythricyl triethylhexanoate, (hydroxystearic acid/stearic acid/logonic acid) dipentaerythrityl, polyglyceryl tetraisostearate, polyglyceryl nonaisostearate-10, deca (erucic acid/Isostearic acid/ricinoleic acid) polyglyceryl-8, (hexyldecanoic acid/sebacic acid) diglyceryl oligoester, glycol distearate (ethylene glycol distearate), diisopropyl dimer dilinoleate, diisostearyl dimer dilinoleate, phytosteryl isostearyl dimer dilinoleate, behenyl/phytosteryl dimer dilinoleate, phytosteryl/isostearyl/cetyl/stearyl/behenyl dimer dilinoleate, dimer dilinoleyl dimer dilinoleate, dimer dilinoleyl diisostearate, dimer dilinoleyl hydrogenated rosinate, hydrogenated castor oil dimer dilinoleate, hydroxyalkyl dimer dilinoleyl ether, glyceryl triisooctanoate, glyceryl triisostearate, glyceryl trimyristate, glyceryl triisopalmitate, trioctanoic acid glyceryl, glyceryl trioleate, glyceryl diisostearate, caprylic/capric triglyceride, tri(caprylic acid/capric acid/myristic acid/stearic acid) glyceryl, hydrogenated rosin triglyceride (hydrogenated ester gum), rosin triglyceride (Ester gum), glyceryl beecosanate, glyceryl di-2-heptyl undecanoate, diglyceryl myristate isostearate, co-acetate cholesteryl, cholesteryl nonanoate, cholesteryl stearate, cholesteryl isostearate, cholesteryl oleate, cholesteryl 12-hydroxystearate, macadamia nut oil fatty acid cholesteryl, macadamia nut oil fatty acid phytosteryl, phytosteryl isostearate, soft lanolin fatty acid cholesteryl, hard lanolin fatty acid cholesteryl, chain-branched fatty acid cholesteryl, long-chain α-hydroxy fatty acid cholesteryl, octyldodecyl ricinoleate, octyldodecyl lanolin fatty acid, octyldodecyl erucate, hardened isostearic acid, avocado oil fatty acid ethyl, and lanolin fatty acid isopropyl.

For example, higher alcohols having 10 to 30 carbon atoms can be used as the low polarity organic compound. When a higher alcohol is used as the emulsion stabilizing component, the amount of hydrophilic surfactant can be reduced, and the water resistance can be further improved. The higher alcohol is a saturated or unsaturated monohydric aliphatic alcohol, and the hydrocarbon group portion may be either linear or branched, but is more preferably linear. Examples of higher alcohols having 10 to 30 carbon atoms include lauryl alcohol, myristyl alcohol, palmityl alcohol, stearyl alcohol, behenyl alcohol, hexadecyl alcohol, oleyl alcohol, isostearyl alcohol, hexyldodecanol, octyldodecanol, cetostearyl alcohol, 2-decyltetradecinol, cholesterol, sitosterol, phytosterol, lanosterol, lanolin alcohol, hydrogenated lanolin alcohol, and the like. In the present invention, it is preferable to use a higher alcohol having a melting point of from 40 to 80° C. alone, or to combine a plurality of higher alcohols so that the melting point is from 40 to 70° C.

The blending amount of the oil agent in the cosmetic composition of the present invention is not particularly limited, but is preferably 5 to 99 mass %, more preferably from 7 to 90 mass %, and still more preferably from 10 to 80 mass %, based on the total mass of the cosmetic composition.

When the cosmetic composition of the present invention contains water (E) described below, in particular, in the case of a water-in-oil emulsion cosmetic composition, the blending amount of the oil agent is preferably 5 to 50 mass %, more preferably 7 to 50 mass %, and still more preferably 10 to 50 mass %, based on the total mass of the cosmetic composition.

On the contrary, when the cosmetic composition of the present invention is anhydrous, the blending amount of the oil agent is preferably 30 to 99 mass %, more preferably 40 to 90 mass %, and still more preferably 50 to 90 mass %, based on the total mass of the cosmetic composition.

(Ultraviolet Light Absorbing Agent)

The oil agent (B) can contain at least one ultraviolet light absorbing agent. That is, the oil phase of the cosmetic composition of the present invention can contain the ultraviolet light absorbing agent. The ultraviolet light absorbing agent is preferably organic, more preferably lipophilic, and still more preferably oil soluble.

The oil-soluble ultraviolet light absorbing agent is not particularly limited as long as it is used in cosmetic compositions or skin external preparations, and examples thereof include those described below. The oil-soluble ultraviolet light absorbing agent can be used alone or as a mixture of two or more.

Cinnamic acid-based ultraviolet light absorbing agents such as benzyl paramethoxycinnamate, 2-ethylhexyl paramethoxycinnamate, and mono-2-ethylhexanoate glyceryl diparamethoxycinnamate; Benzophenone-based ultraviolet light absorbing agents such as hydroxymethoxybenzophenone, dihydroxymethoxybenzophenone, dihydroxybenzophenone, and tetrahydroxybenzophenone; Benzoic acid ester-based ultraviolet light absorbing agents such as paraaminobenzoic acid, ethyl paraaminobenzoate, glyceryl paraaminobenzoate, amyl paradimethylaminobenzoate, octyl paradimethylaminobenzoate, 4-[N, N-di (2-hydroxypropyl) amino]ethyl benzoate, and diethylaminohydroxy hexyl benzoyl benzoate; Salicylic acid-based ultraviolet light absorbing agents such as ethylene glycol salicylate, phenyl salicylate, octyl salicylate, benzyl salicylate, paratershary butyl phenyl salicylate, homomentyl salicylate; Triazine-based ultraviolet light absorbing agents such as ethylhexyltriazone (2,4,6-tris[4-(2-ethylhexyloxycarbonyl) anilino]1,3,5-triazine), bisethylhexyloxyphenol methoxyphenyltriazine;

Other ultraviolet light absorbing agents such as 4-tarshary butyl-4'-methoxydibenzoylmethane, menthyl anthranilate, 2-(2-hydroxy-5-methylphenyl) benzotriazole, 2-ethylhexyl dimethoxybenzylidene dioxoimidazolidine propionate, octocrylene, dimethicodiethyl benzylmalonate.

Among these, the ultraviolet light absorbing agents such as 2-ethylhexyl paramethoxycinnamate, mono-2-ethylhexanate diparamethoxycinnamate, octyl salicylate, homomentyl salicylate, bisethylhexyloxyphenol methoxyphenyltriazine, dihydroxybenzophenone, octocrylene, 4-tashalibutyl-4'-methoxydibenzoylmethane, hexyl diethylaminohydroxybenzoyl benzoate can be selected to acquire a particularly high ultraviolet protection effect.

The blending amount of the ultraviolet light absorbing agent in the cosmetic composition of the present invention is not particularly limited, but is preferably from 0 to 30 mass %, more preferably from 0.1 to 20 mass %, based on the total mass of the cosmetic composition. However, in the cosmetic composition of the present invention, the ultraviolet light absorbing agent is an optional component, and may not be blended.

[Oil-Soluble Film-Forming Agent]

The cosmetic composition of the present invention can include an oil-soluble film-forming agent (C).

A hydrophobic organic polymer and/or a silicone film-forming agent are preferable as the oil-soluble film-forming agent (C).

Examples of the hydrophobic organic polymer include rosin acid based resins such as pentaerythritrit rosin acid and glyceryl rosin acid, candelilla resin, polyvinyl acetate resin, polyisobutylene, and the like. Note that the candelilla resin is a resin obtained by fractionating candelilla wax with an organic solvent, wherein the resin content is preferably 65 mass % or more, and more preferably 85 mass % or more.

The silicone film-forming agent is more preferably at least one selected from a group consisting of:
a silicone resin containing M units and Q units,
silicone acrylate; a silicone resin containing T units; and
silicone resin gum.

The silicone resin containing M units and Q units may be any silicone resin normally used in cosmetic compositions. The silicone resin containing M units and Q units (D1) may be any silicone resin as long as it includes triorganosiloxy units (M units) (for example, organo groups are only alkyl groups such as methyl groups or aryl groups such as alkyl groups such as methyl groups and allyl groups such as vinyl groups or aryl groups such as phenyl groups) and siloxy units (Q units). Examples thereof include MQ resins, MDQ resins, MDTQ resins (D represents diorganosiloxy units; for example, organo groups are only alkyl groups such as methyl groups or aryl groups such as alkyl groups such as methyl groups and allyl groups such as vinyl groups or aryl groups such as phenyl groups). More specifically, trimethyl siloxysilicate, polyalkyl siloxysilicate, trimethyl siloxysilicate containing dimethylsiloxy units, and alkyl (perfluoroalkyl) siloxysilicate are exemplified. These silicone resins are oil-soluble, and those that can be dissolved in tetracyclosiloxane (D4) or pentacyclosiloxane (D5) are particularly preferable.

Among these, trimethylsiloxysilicate is preferred. Examples of commercially available products include 749Fluid (manufactured by Dow Corning Toray Co., Ltd.), X-21-5595, KF-7312J, and KF-7312F (both available from Shin-Etsu Chemical Co., Ltd.). These may be used independently, or may be used in combination as appropriate.

Examples of the silicone acrylate include a copolymer having a polyalkyl acrylate skeleton and a dimethicone polymer grafted to an alkyl ester side chain, such as a cyclopentasiloxane (and) acrylate/dimethicone copolymer (KP-545 manufactured by Shin-Etsu Chemical Co., Ltd.) and a methyltrimethicone (and) acrylate/dimethicone copolymer (KP-549 manufactured by Shin-Etsu Chemical Co., Ltd.). Also, a copolymer having a polyalkyl acrylate skeleton and a siloxane dendron structure grafted to an alkyl ester side chain, such as FA4001CM, FA40021D, FA4103, FA4003DM, FA40041D (manufactured by Dow Corning Toray Co., Ltd.), which is a (acrylates/polytrimethylsiloxy methacrylate) copolymer. These may be used independently, or may be used in combination as appropriate.

The silicone resin containing T units may be any silicone resin normally used in cosmetic compositions. The silicone resin containing T units (D3) may be any silicone resin as long as it has monoorganosiloxane units (T unit) (e.g., organo groups are alkyl groups such as methyl groups, or allyl groups such as vinyl groups, or aryl groups such as phenyl groups), and examples thereof include MTQ resins, MDTQ resins, TD resins, TQ resins, TDQ resins, and the like. It is particularly preferable that these silicone resins are oil-soluble and can be dissolved in D4 and D5.

Specific examples of the silicone resin containing T units include 670Fluid, which is polypropylsilsesquioxane, and SW-8005 C30 resin wax (manufactured by Dow Corning Toray Co., Ltd.), which is alkyl (C30-45) dimethylsilyl polypropylsilsesquioxane, and the like. These may be used independently, or may be used in combination as appropriate.

Examples of the silicone resin gum include FC-50021DD (manufactured by Dow Corning Toray Co., Ltd.), which is a (trimethylsiloxysilicate/dimethiconol) crosspolymer, and the like.

The blending amount of the oil-soluble film-forming agent in the cosmetic composition is not particularly limited, but is preferably 0.01 to 25 mass %, more preferably 0.05 to 20 mass %, and still more preferably from 0.1 to 15 mass %, based on the total mass of the cosmetic composition of the present invention.

[Hydrophobic Powder]

The cosmetic composition of the present invention may contain at least one hydrophobic powder (D).

The "powder" in the present invention is generally used as a component of a cosmetic composition, and includes white and colored pigments, microparticles (including so-called nanoparticles) such as ultraviolet scattering agents, and extender pigments. The white and colored pigments are used for coloring cosmetic compositions and the like, while the extender pigments are used for improving the feel of cosmetic compositions. As the "powder" of the present invention, white and colored pigments commonly used in cosmetic compositions, as well as extender pigments can be used without particular limitation. It is preferred to blend one or more powders.

The shape of the powder (spherical shape, rod shape, needle shape, plate shape, irregular shape, spindle shape, and the like), particle size (aerosol, fine particles, pigment grade, and the like), and the particle structure (porous, non-porous, and the like) are not limited, however, the average primary particle size is preferably in the range of 1 nm to 100 μm.

Examples of the powder include inorganic powders, organic powders, surfactant metal salt powders (metal soaps), colored pigments, pearl pigments, metal powder pigments, and composites of these. Specifically, examples of the inorganic powders include titanium oxide, zirconium oxide, zinc oxide, cerium oxide, magnesium oxide, barium sulfate, calcium sulfate, magnesium sulfate, calcium sulfate, magnesium carbonate, talc, mica, kaolin, sericite, muscovite, synthetic mica, phlogopite, lepidolite, biotite, lithia mica, silicic acid, silicic anhydride, aluminum silicate, sodium silicate, sodium magnesium silicate, magnesium silicate, magnesium aluminum silicate, calcium silicate, barium silicate, strontium silicate, metal tungstate, hydroxyapatite, vermiculite, hydrargilite, bentonite, montmorillonite, hectorite, zeolite, ceramic powder, dicalcium phosphate, alumina, aluminum hydroxide, boron nitride, and boron nitride; examples of the organic powders include polyamide powder, polyester powder, polyethylene powder, and polypropylene powder, polystyrene powder, polyurethane powder, polystyrene powder, benzoganamine powder, polymethylbenzoganamine powder, polytetrafluoroethylene powder, polymethyl methacrylate powder, cellulose, silk powder, nylon powder, 12-nylon, 6-nylon, silicone powder, polymethylsilsesquioxane spherical powder, styrene/acrylic acid copolymer, divinylbenzene/styrene copolymer, vinyl resin, urea resins, phenol resin, fluororesin, silicon resin, acrylic resin, melamine resin, epoxy resin, polycarbonate resin, microcrystalline fiber powder, starch powder, and lauroyl lysine; examples of the surfactant metal salt powders include zinc stearate, aluminum stearate, calcium stearate, magnesium stearate, zinc myristate, magnesium myristate, zinc palmitate, zinc laurate, zinc cetyl phosphate, calcium cetyl phosphate, and sodium zinc cetyl phosphate; examples of the colored pigments include inorganic red pigments such as red oxide, iron oxide, iron hydroxide, iron titanate, inorganic brown pigments such as γ-iron oxide, inorganic yellow pigments such as yellow iron oxide, inorganic black pigments such as black iron oxide, carbon black, inorganic purple pigments such as manganese violet, cobalt violet, inorganic green pigments such as chromium hydroxide, chromium oxide, cobalt oxide, cobalt titanate, inorganic blue pigments such as prussian blue, ultramarine blue, tar dyes such as Red No. 3, Red No. 104, Red No. 106, Red No. 201, Red No. 202, Red No. 204, Red No. 205, Red No. 220, Red No. 226, Red No. 227, Red No. 228, Red No. 230, Red No. 401, Red No. 505, Yellow No. 4, Yellow No. 5, Yellow No. 202, Yellow No. 203, Yellow No. 204, Yellow No. 401, Blue No. 1, Blue No. 2, Blue No. 201, Blue No. 404, Green No. 3, Green No. 201, Green No. 204, Green No. 205, Orange No. 201, Orange No. 203, Orange No. 204, Orange No. 206, Orange No. 207 and those obtained by laking the tar dyes, those obtained by laking natural dyes such as carmine acid, lacquemic acid, carthamine, braziline, and chrosine; examples of the pearl pigments include titanium oxide-coated mica, titanated mica, iron oxide-treated titanated mica, titanium oxide-coated mica, bismuth oxychloride, titanium oxide-coated bismuth oxychloride, titanium oxide-coated talc, fish scale foil, titanium oxide-coated colored mica and the like; oxidized titanium oxide coated mica, oxychlorinated bismuth, titanium oxide coated bismuth oxychloride, titanium oxide coated tantalum foil, fish scaly foil, and titanium oxide coated colored mica; and examples of the metal powder pigments include metal powders such as aluminum, gold, silver, copper, platinum, and stainless steel.

When the surface of the powder itself is not hydrophobic, the surface is preferably subjected to hydrophobizing treatment. Note that these hydrophobic powders may be complexed together.

The hydrophobizing treatment is not particularly limited, and the powder is treated with various hydrophobizing surface treatment agents, for example, organosiloxane treatment such as methyl hydrogen polysiloxane (methicone in the Japanese cosmetics labeling name) treatment, (dimethicone/methicone) copolymer (hydrogen dimethicone in Japanese cosmetics labeling name) treatment, dimethylpolysiloxane (dimethicone in Japanese cosmetics labeling name) treatment, silicone resin treatment, silicone gum treatment, acrylic silicone treatment, and fluorinated silicone treatment; metal soap treatment such as zinc stearate treatment; silane treatment such as silane coupling agent treatment and alkylsilane treatment; fluorine compound treatment such as perfluoroalkylsilane, perfluoroalkyl phosphate ester salt, and perfluoro-ether treatment; amino acid treatment such as N-lauroyl-L-lysine treatment; oil treatment such as a squalane treatment; acrylic treatments such as alkyl acrylate treatment, and the like. Two or more of these treatments can be used in combination.

The powder may be subjected to hydrophobic surface treatment using the component (A) or other carboxylic acid modified silicone. For example, some or all of the powder may be surface-treated using a part of the component (A) and blended into the cosmetic composition of the present invention.

Among these treatments, treatment with the silicone compound is preferable in terms of water resistance and ease of dispersion by the carboxylic acid modified silicone, and the treatment with methylhydrogenpolysiloxane, (dimethicone/methicone) copolymer, dimethylpolysiloxane, and alkylsilane is particularly preferable. It should be noted that even when the surface is treated with the component (A) or other carboxylic acid modified silicones, there is a practical advantage in that the water resistance is excellent and the dispersion stability is excellent.

A silicone elastomer powder may also be used as the hydrophobic powder. The silicone elastomer powder is a crosslinked product of a linear diorganopolysiloxane mainly composed of a diorganosiloxy unit (D unit), and can be suitably obtained by crosslinking an organohydrogenpolysiloxane having a silicon-bonded hydrogen atom at the side chain or end and a diorganopolysiloxane having an unsaturated hydrocarbon group such as an alkenyl group at the side chain or end under a hydrosilylation reaction catalyst. Since the silicone elastomer powder is soft, elastic, and excellent in oil absorption compared to the silicone resin powder composed of a T unit and a Q unit, the silicone elastomer powder can absorb oil and fat on the skin and prevent cosmetic collapse.

The silicone elastomer powder may have various shapes, such as spherical, flat, or indefinite. The silicone elastomer powder may be in the form of an oil dispersion. The cosmetic composition of the present invention is a silicone elastomer powder having a particle shape, a primary particle diameter thereof determined by observation using an electron microscope and/or an average primary particle diameter measured by laser diffraction/scattering method falls within a range of 0.1 to 50 µm, and a silicone elastomer powder having a spherical primary particle shape can be suitably compounded. The silicone elastomer constituting the silicone elastomer powder is preferably a silicone elastomer having a hardness of 80 or less, more preferably 65 or less according to JIS K 6253 "Hardness testing method for rubber, vulcanized or thermoplastic" as measured by type-A durometer.

The silicone elastomer powder may optionally be subjected to a surface treatment with a silicone resin, silica, or the like. Examples of the surface treatment include those described in JP 2-243612 A, JP 8-12545 A, JP 8-12546 A, JP 8-12524 A, JP 9-241511 A, JP 10-36219 A, JP 11-193331 A, and JP 2000-281523 A. The silicone elastomer powder corresponds to the crosslinked silicone powder listed in the "Japanese Cosmetic Ingredients Codex". Commercial products of silicone elastomeric powders include, for example, Trefil E-506S, Trefil E-508, 9701 Cosmetic Powder, and 9702 Powder, available from Dow Corning Toray Co., Ltd. The silicone elastomeric powders may be surface-treated, and examples of the surface treatment agent include, for example, methylhydrogenpolysiloxane, silicone resin, metal soap, silane coupling agent, inorganic oxide such as silica and titanium oxide, fluorine compound such as perfluoroalkylsilane and perfluoroalkylphosphate ester salt.

Among these hydrophobic powders, hydrophobized fine particle inorganic powders are preferably used in terms of the ultraviolet light blocking effect, and among these hydrophobic powders, hydrophobic particulate titanium oxide and/or hydrophobized particulate zinc oxide are preferable. The particle size of the hydrophobized particulate titanium oxide and/or hydrophobized particulate zinc oxide is preferably 1 to 200 nm in terms of the ultraviolet light blocking effect and dispersibility, and more preferably 10 to 80 nm. Furthermore, in the present invention, hydrophobized inorganic pigment powder, pearl pigment powder, or the like may be used as hydrophobic inorganic particles, or a combination of the hydrophobized fine particle inorganic powder described above and the hydrophobized inorganic pigment powder may be used.

The blending amount of the hydrophobic powder in the cosmetic composition of the present invention is not particularly limited, however, is preferably 1 to 80 mass %, more preferably 2 to 60 mass %, still more preferably 3 to 50 mass %, still more preferably 4 to 30 mass %, and still more preferably 5 to 25 mass %, based on the total mass of the cosmetic composition.

[Water]

The cosmetic composition of the present invention may be anhydrous, but may also contain water (E). The water preferably forms an aqueous phase in the cosmetic composition of the present invention.

When the cosmetic composition of the present invention contains water, the cosmetic composition is preferably a water-in-oil type in which water constitutes a discontinuous phase and the oil agent constitutes a continuous phase, more preferably a water-in-oil emulsion cosmetic composition.

When the cosmetic composition of the present invention contains water, the blending amount of water in the cosmetic composition is not particularly limited, however, is preferably 5 to 80 mass %, more preferably 10 to 75 mass %, and still more preferably from 15 to 70 mass %, based on the total mass of the cosmetic composition.

[Surfactant]

The cosmetic composition of the present invention may contain at least one surfactant (F). The blending application of the surfactant is not particularly limited, and may be that of a dispersant of a powder component, a cleaning component, or an emulsifier, however, when the cosmetic composition of the present invention is a water-in-oil cosmetic composition in which the oil phase including the above-mentioned oil agent as a main component constitutes a continuous phase, it is particularly preferable to use a surfactant capable of forming a water-in-oil emulsion. A preferred surfactant for forming a water-in-oil cosmetic composition will be described below.

The surfactant (F) is not particularly limited, but examples thereof include anionic, cationic, nonionic, and amphoteric surfactants.

The surfactant is preferably a nonionic surfactant, and more preferably a silicone nonionic surfactant.

Examples of the silicone nonionic surfactant include silicone surfactants such as polyether-modified silicones, alkyl/polyether co-modified silicones, glycerin-modified silicones, polyglycerin-modified silicones, sugar-modified silicones, sugar alcohol-modified silicones, and the like.

Specific examples include linear polyoxyalkylene-modified organopolysiloxane (polyether-modified silicone bonded to polyoxyalkylene group at the side chain and/or end), block copolymer-type polyoxyalkylene-dimethylpolysiloxane copolymer, and linear polyoxyalkylene-alkyl comodified organopolysiloxane (alkyl/polyether-modified silicone bonded to polyoxyalkylene groups and alkyl groups at the side chain and/or end). In addition, certain elastomeric silicone polyethers described in JP 4080597 B (JP 11-49957 A), JP 2001-011281 A, and the like (commercially available products are DC 9011 Silicone Elastomer Blend, manufactured by Dow Corning Corporation, U.S.A.) are also preferably exemplified.

In addition, non-silicone nonionic surfactants such as polyglycerol fatty acid esters, sucrose fatty acid esters, sorbitan fatty acid esters, polyoxyethylene polyoxypropylene block polymers, and polyoxyethylene polyoxypropylene block polymers may be used as the nonionic surfactant.

The HLB of the surfactant is preferably 2 to 7, and more preferably 3 to 6. Here, the HLB (hydrophilic-lipophilic balance) value is a value obtained by a Griffine method. When the HLB of the surfactant is in the range described above, water resistance of the cosmetic composition is not diminished, and when the cosmetic composition is a water-in-oil emulsion cosmetic composition, stability is further improved.

The blending amount of the surfactant in the cosmetic composition of the present invention is not particularly limited, however, when the cosmetic composition of the present invention is a water-in-oil emulsion cosmetic composition containing an oil phase as a continuous phase, the blending amount of the above-mentioned surfactant is preferably 0.5 to 15 mass %, more preferably 1 to 10 mass %, and still more preferably from 2 to 8 mass %, based on the total mass of the cosmetic composition.

[Polyhydric Alcohol]

The cosmetic composition of the present invention may contain at least one polyhydric alcohol (G).

The use of the polyhydric alcohol can adjust the feeling of moisturization and the sensation of use of the cosmetic composition of the present invention, and when the cosmetic composition of the present invention contains a hydrophobic powder, the hydrophobic powder can be dispersed in the aqueous phase well by mixing the component (A) and the hydrophobic powder with the polyhydric alcohol in advance and then, mixed with other components to prepare the cosmetic composition.

Examples of the polyhydric alcohol include sorbitol, xylitol, propylene glycol, dipropylene glycol, 1,3-butylene glycol, glycerin, diglycerin, and polyethylene glycol, and these polyhydric alcohols can be used independently or in combination of two or more. When the component (A) and the hydrophobic powder are mixed together with the polyhydric alcohol in advance, the liquid polyhydric alcohol can be uniformly dispersed in the aqueous phase, and among the same, propylene glycol, dipropylene glycol, 1,3-butylene glycol, glycerin, diglycerin, and combinations thereof are preferable.

The blending amount of the polyhydric alcohol in the cosmetic composition of the present invention is not particularly limited, but is preferably 0.1 to 20 mass %, more preferably 0.5 to 15 mass %, and still more preferably from 1 to 10 mass %, based on the total mass of the cosmetic composition.

[Basic Compound]

The cosmetic composition of the present invention is preferably substantially free of a basic compound.

When the cosmetic composition contains the basic compound, the carboxylic acid of the carboxylic acid modified silicone (A) is neutralized and becomes hydrophilic, possibly decreasing water resistance.

"Substantially free of" excludes the possibility that the basic compound is contained at a blending amount so as to exhibit its potency as a base and sufficiently neutralize the carboxylic acid modified silicone (A) to impair water resistance of the cosmetic film applied to the skin. Specifically, the amount of the base component when included is 0.2 mass % or less, and is preferably, particularly 0.1 mass % or less in the total amount of the cosmetic composition. Alternatively, in the case of a monovalent base per 1 mol of the carboxylic acid group contained in the blended carboxylic acid modified silicone, the carboxylic acid group/monovalent base (molar ratio) is preferably 0.1/1 or less.

[Optional Components]

Other components ordinarily used in cosmetic compositions can be added to the cosmetic composition of the present invention within a range that does not hinder the effect of the present invention, and examples of other such components include: hydrophilic powders, moisturizing agents other than the component (G), water-soluble thickening agents, antiseptic agents, antimicrobial agents, perfumes, salts, antioxidants, pH adjusting agents other than the basic compound described above, chelating agents, refreshing agents, anti-inflammatory agents, physiologically active components (skin lightening agents, cell activating agents, rough skin improving agents, circulation promoters, skin astringents, anti-seborrheic agents, etc.), vitamins, amino acids, nucleic acids, hormones, and inclusion compounds. Other components are not particularly limited.

[Manufacturing Method]

The manufacturing steps of the cosmetic composition of the present invention may be any steps and are not particularly limited as long as the steps can mix the above components to prepare the cosmetic composition containing the carboxylic acid modified silicone (A) that has the specific chemical structure describe above and is liquid at room temperature (25° C.), and the oil agent (B).

If necessary, at least one selected from the group consisting of the above components (C), (D), (E), (F), and (G), and/or the basic compound may be further mixed.

[Usage Method]

The cosmetic composition of the present invention may be in the form of cream, gel, emulsion, liquid, paste, or solid. For example, the cosmetic composition of the present invention can be used as a base cosmetic composition such as milk, cream, serum, or the like; a base cosmetic composition; a sunscreen agent; and makeup cosmetic compositions such as foundations, eye shadows, eyeliners, and water powders, as well as sunscreen agents for hair and scalp, temporary hair colorants, and the like.

The cosmetic composition of the present invention can also be used as a precursor for a cosmetic composition (premix or cosmetic raw material).

The cosmetic composition of the present invention contains the oil agent and thus, can form a cosmetic film with excellent water resistance. Further, when the cosmetic composition of the present invention is in the form of an anhydrous or water-in-oil emulsion composition, and the oil phase constitutes a continuous phase, the oil is in direct contact with the skin, further improving water resistance of the cosmetic film.

The cosmetic composition of the present invention is preferably a skin cosmetic composition, and is more preferably applied onto weak acid skin, and for example, the cosmetic composition is preferably applied onto skin having a pH of 5.1 to 7.0.

In addition, when the cosmetic composition of the present invention is applied onto the skin at an applied amount of 0.5 mg/cm$^2$, after an elapse of 30 minutes, the pH of the application surface is preferably 7.0 or lower, and more preferably 6.7 or lower.

Because the cosmetic composition of the present invention is stable and can form a cosmetic film having excellent water resistance on the skin, the cosmetic composition inhibits makeup loss due to sweat, rain, and the like, and has excellent cosmetic durability.

EXAMPLES

Hereinafter, the present invention is described in greater detail based on examples; but the present invention is not limited thereto.

Synthesis Example 1

230.67 g of trimethylsilyl undecylenate and 0.042 g of a platinum-1,3-divinyl-1,1,3,3-tetramethyldisiloxane complex were put into a flask equipped with a stirrer, a reflux condenser, a dropping funnel, and a thermometer, and 129.33 g of Si—H siloxane expressed by the following general formula was dropped thereinto so as to maintain the range of 70 to 80° C.

[Formula 3]

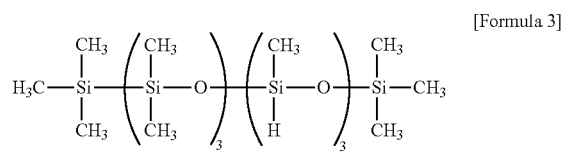

After the completion of dropping, the mixture was aged for 2 hours at 110° C., and then the loss of Si—H bonds was confirmed by the hydrogen generation method. A low boiling point content was distilled off under reduced pressure. Thereafter, 90 g of deionized water was added, and the mixture was aged under reflux for 4 hours for deprotection. Thereafter, the low boiling point content was again removed under reduced pressure to obtain a compound 1. As a result of analysis, it was confirmed that the chemical structure of the compound 1 was expressed by the following chemical formula:

[Formula 4]

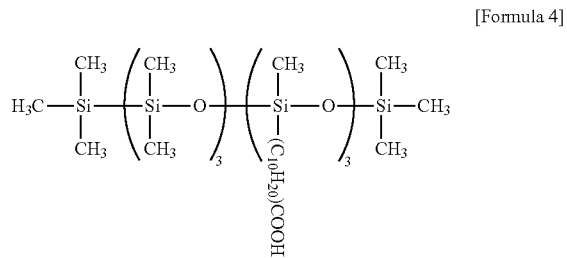

(Compound 1)

Synthesis Example 2

100 g of 1,1,1,3,5,5,5-heptamethyltrisiloxane and 0.02 g of toluene solution of platinum-1,3-divinyl-1-1,3,3-tetramethyldisiloxane complex were put into a flask equipped with a stirrer, a reflux condenser, a dripping funnel, and a thermometer, and 105 g of trimethylsilyl undecylenate was dropped thereinto so as to maintain the range of 70 to 100° C. After the completion of dropping, the mixture was aged for 2 hours at 110° C., and then the loss of Si—H bonds was confirmed by the hydrogen generation method. A low boiling point content was distilled off under reduced pressure. Then, water was added, and the mixture was aged under reflux for 4 hours for deprotection. Thereafter, the low boiling point content was again removed under reduced pressure to obtain a compound 2. As a result of analysis, it was confirmed that the chemical structure of the compound 2 was expressed by the following chemical formula:

[Formula 5]

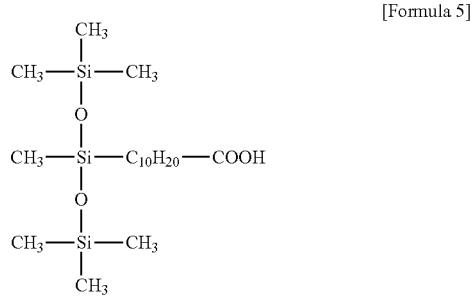

(Compound 2)

Example 1 and Comparative Example 1

The compositions of Example 1 and Comparative Example 1 were manufactured by the manufacturing method described below using the components illustrated in Table 1.

The blending amount of each component in Table 1 is represented in "mass %" ("weight %") unless otherwise specified.
(Manufacturing Method)
(1) A phase A is mixed.
(2) A phase B is mixed.
(3) The mixture obtained in the above (1) is added little by little to the mixture obtained in the above (2) at normal room temperature to prepare an emulsion.
(4) A component C is mixed with the emulsion obtained in the above (3) to form a water-in-oil sunscreen cream.

TABLE 1

| Phase | Component | Example 1 | Comparative Example 1 |
|---|---|---|---|
| A | Water | Residual | Residual |
|  | Glycerin | 5 | 5 |
|  | Sodium chloride | 1 | 1 |
| B | Lauryl PEG-10 Tris (trimethylsiloxy) Silylethyldimethicone | 2 | 2 |
|  | Ethylhexyl methoxycinnamate | 3 | 3 |
|  | Cyclopentasiloxane | 5 | 5 |
|  | Cyclopentasiloxane (and) trimethyl-siloxysilicate (polymer concentration 40 mass %) | 2.25 | 2.25 |
|  | Caprylic/capric triglyceride | 2 | 2 |
|  | Zinc oxide (and) cyclopentasiloxane (and) lauryl PEG-10 tris (trimethylsiloxy) silyl ethyl dimethicone | 15 | 15 |
| C | Compound 1 | 3 | — |
|  | Evaluation results |  |  |
|  | Water resistance | ◉ | ◉ |
|  | Removability | ◉ | X |

(Evaluation of Water Resistance)
Each of the compositions in Example 1 and Comparative Example 1 was applied uniformly onto artificial leather with an application amount of 2 mg/cm², and after an elapse of 30 minutes, water droplets of water having a pH of 7.0 were gently dripped, and water droplets formed on the surface were photographed, and the contact angle was measured using a θ/2 method based on the shape and evaluated according to the criteria described below.
  ◉: Average value of contact angles is 75 degrees or more.
  ○: Average value of contact angles is 70 degrees or more and less than 75 degrees.
  Δ: Average value of contact angles is 60 degrees or more and less than 70 degrees.
  x: Average value of contact angles is less than 60 degrees.
The results are illustrated in Table 1.
(Evaluation of Removability of Emulsion)
Each of the compositions in Example 1 and Comparative Example 1 was uniformly applied to artificial leather with an applied amount of 2 mg/cm², and after an elapse of 30 minutes, was washed using a commercial hand soap (medicinal liquid hand soap manufactured by Lion Corporation). The ease of rinsing of the cosmetic film was visually observed, and removability was evaluated according to the criteria below.
  ◉: Almost completely removed.
  ○: Almost removed, but some residue of the composition is observed.
  Δ: Partially removed but residue of the composition is noticeable.
  x: Not removed.
The results are illustrated in Table 1.
As is clear from Example 1, when the carboxylic acid modified silicone (A) that is expressed by the above structural formula (1) and is liquid at room temperature (25° C.)

is used, an emulsion that has excellent water resistance and can be easily removed using normal soap and water can be obtained. On the contrary, as is clear from Comparative Example 1, when the carboxylic acid modified silicone (A) is not used, an emulsion that can be easily removed using normal soap and water cannot be obtained.

Example 2 and Comparative Examples 2 to 4

The compositions of Example 2 and Comparative Examples 2 to 4 were manufactured by the manufacturing method described below using the components illustrated in Table 2. The blending amount of each component in Table 2 is represented in "mass %" ("weight %") unless otherwise specified.

(Manufacturing Method)
(1) Components in a phase A are mixed.
(2) Components in a phase B are mixed.
(3) The mixture of the components in the phase B is added little by little to the mixture of the components in the phase A at normal room temperature to prepare an emulsion.
(4) A component C is mixed with the gel emulsion to prepare a cosmetic composition.

TABLE 2

| | | Example 2 | Comparative Example 2 | Comparative Example 3 | Comparative Example 4 |
|---|---|---|---|---|---|
| A | Cyclopentasiloxane | 18.00 | 18.00 | 19.00 | 18.00 |
| | Dimethicone (50 mm²/s) | 15.00 | 15.00 | 15.00 | 15.00 |
| | (Dimethicone/vinyl dimethicone) crosspolymer: dimethicone (25:75) | 3.50 | 3.50 | 3.50 | 3.50 |
| | PEG-10 dimethicone | 2.50 | 2.50 | 2.50 | 2.50 |
| | PEG-9 Polydimethylsiloxyethyl-dimethicone | 2.00 | 2.00 | 2.00 | 2.00 |
| | Sorbitan sesquiisostearate | 0.90 | 0.90 | 0.90 | 0.90 |
| | Sorbitan sesquioleate | 0.30 | 0.30 | 0.30 | 0.30 |
| | Aluminum stearate treated fine particle titanium oxide | 8.00 | 8.00 | 8.00 | 8.00 |
| | Metal soap-treated color pigment (titanium oxide, red iron oxide, yellow iron oxide, black iron oxide) | 9.90 | 9.90 | 9.90 | 9.90 |
| | Ethylhexyl palmitate | 6.00 | 6.00 | 6.00 | 6.00 |
| | Disteardimonium hectorite | 1.50 | 1.50 | 1.50 | 1.50 |
| B | Purified water | 25.00 | 25.00 | 25.00 | 25.00 |
| | Sodium chloride | 1.00 | 1.00 | 1.00 | 1.00 |
| | Butylene glycol | 5.00 | 5.00 | 5.00 | 5.00 |
| | Phenoxyethanol | 0.40 | 0.40 | 0.40 | 0.40 |
| C | Compound 1 | 1.00 | — | — | — |
| | Compound 2 | — | 1.00 | — | — |
| | Isostearic acid | — | — | — | 1.00 |
| | Total | 100.00 | 100.00 | 100.00 | 100.00 |
| | Evaluation results | | | | |
| | Water resistance | ⊚ | ⊚ | ⊚ | ⊚ |
| | Removability | ○ | Δ | X | X |

(Evaluation of Water Resistance)

Each of the compositions in Example 1 and Comparative Example 1 was applied uniformly onto artificial leather with an application amount of 0.5 mg/cm², and after an elapse of 30 minutes, water droplets of water having a pH of 7.0 were gently dripped, and water droplets formed on the surface were photographed, and the contact angle was measured using a θ/2 method based on the shape and evaluated according to the criteria described below.

⊚: Average value of contact angles is 75 degrees or more.
○: Average value of contact angles is 70 degrees or more and less than 75 degrees.
Δ: Average value of contact angles is 60 degrees or more and less than 70 degrees.
x: Average value of contact angles is less than 60 degrees.

The results are illustrated in Table 2.

(Evaluation of Removability of Emulsion)

Each of the compositions in Example 2 and Comparative Examples 2 to 4 was applied on artificial skin (bioskin plate manufactured by Beaulax) at an applied amount of 0.5 mg/cm² with a finger fitted with a rubber fingerstall and after an elapse of 30 minutes, was washed using a commercially available alkaline solid soap (Kao White manufactured by Kao Corporation). The ease of rinsing of the cosmetic film was visually observed, and removability was evaluated according to the following criteria.

⊚: Almost completely removed.
○: Almost removed, but some residue of the composition is observed.
Δ: Partially removed but residue of the composition is noticeable.
x: Not removed.

The results are illustrated in Table 2.

As is clear from the results illustrated in Table 2, it can be seen that the composition in Example 2 using the carboxylic acid modified silicone (A) that is expressed by the above structural formula (1) and is liquid at room temperature (25° C.) is superior to the composition in Comparative Example 3 using no carboxylic acid modified silicone in removability with soap. On the contrary, the composition in Comparative Example 4 using a higher fatty acid (isostearic acid) having the same carboxyl group, and the composition in Comparative Example 2 using the compound 2 that does not correspond to the carboxylic acid modified silicone (A) and has an a/b of 0/1 in the structural formula (1) exhibited inferior removability with soap.

Example 3 and Comparative Examples 5 and 6

The compositions of Example 3 and Comparative Examples 5 to 6 were manufactured by the manufacturing method described below using the components illustrated in Table 3. The blending amount of each component in Table 3 is represented in "mass %" ("weight %") unless otherwise specified.

(Manufacturing Method)
(1) Components in a Phase A are heated to 110° C., and mixed and dissolved.
(2) A phase B, a phase C, and a phase D are added to the mixture liquid prepared in the above (1), and are uniformly mixed at 90° C.
(3) The mixture liquid prepared in the above (2) in a molten state is filled into a metal container, and then cooled to form an oil-based foundation.

TABLE 3

| | | Example 3 | Comparative Example 5 | Comparative Example 6 | Comparative Example 7 |
|---|---|---|---|---|---|
| A | Polyethylene | 5.00 | 5.00 | 5.00 | 5.00 |
| | Beeswax | 1.00 | 1.00 | 1.00 | 1.00 |
| | Microcrystalline wax | 4.50 | 4.50 | 4.50 | 4.50 |

TABLE 3-continued

|   |   | Example 3 | Comparative Example 5 | Comparative Example 6 | Comparative Example 7 |
|---|---|---|---|---|---|
|   | Tocopherol | 0.15 | 0.15 | 0.15 | 0.15 |
|   | Dipentaerythrityl hexahydroxystearate | 5.40 | 5.40 | 5.40 | 5.40 |
|   | Polyglyceryl-2 triisostearate | 5.40 | 5.40 | 5.40 | 5.40 |
|   | Diphenylsiloxyphenyl trimethicone | 21.00 | 21.00 | 21.00 | 21.00 |
|   | Phenylpropyldimethyl-siloxysilicic acid | 12.00 | 12.00 | 12.00 | 12.00 |
| B | Hydrogen dimethicone treated microparticle titanium oxide | 10.00 | 10.00 | 10.00 | 10.00 |
|   | Hydrogen dimethicone treated synthetic phlogopite | 2.00 | 2.00 | 2.00 | 2.00 |
|   | Dimethicone treated pigment (titanium oxide, red iron oxide, yellow iron oxide, black iron oxide) | 18.00 | 18.00 | 18.00 | 18.00 |
|   | Silica | 0.10 | 0.10 | 0.10 | 0.10 |
|   | Lauroyl lysine | 1.00 | 1.00 | 1.00 | 1.00 |
| C | Isocetyl myristate | Remaining amount | Remaining amount | Remaining amount | Remaining amount |
|   | Titanium oxide coated synthetic phlogopite | 1.20 | 1.20 | 1.20 | 1.20 |
|   | Mica titanium | 0.90 | 0.90 | 0.90 | 0.90 |
|   | Iron oxide coated mica titanium | 2.00 | 2.00 | 2.00 | 2.00 |
|   | Mica | 0.30 | 0.30 | 0.30 | 0.30 |
| D | Pentylene glycol | 1.00 | 1.00 | 1.00 | 1.00 |
|   | Compound 1 | 0.50 | — | — | — |
|   | Compound 2 | — | — | 0.50 | — |
|   | Polysorbate 60 | — | — | — | 0.50 |
|   | Evaluation results |   |   |   |   |
|   | Water resistance | ◎ | ◎ | ◎ | Δ |
|   | Removability | ◎ | X | Δ | ○ |

(Evaluation of Water Resistance)

Each of the compositions in Example 3 and Comparative Examples 5 to 7 were applied uniformly onto artificial leather with an application amount of 0.5 mg/cm2, and after an elapse of 30 minutes, water droplets of water having a pH of 7.0 were gently dripped, and water droplets formed on the surface were photographed, and the contact angle was measured using a θ/2 method based on the shape and evaluated according to the criteria described below.

◎: Average value of contact angles is 75 degrees or more.
○: Average value of contact angles is 70 degrees or more and less than 75 degrees.
Δ: Average value of contact angles is 60 degrees or more and less than 70 degrees.
x: Average value of contact angles is less than 60 degrees.

The results are illustrated in Table 3.

(Evaluation of Removability of Composition)

Each of the compositions in Example 3 and Comparative Examples 5 to 7 was applied on artificial skin (bioskin plate manufactured by Beaulax) at an applied amount of 0.5 mg/cm$^2$ with a finger fitted with a rubber fingerstall and after an elapse of 30 minutes, was washed using a commercially available alkaline solid soap (Kao White manufactured by Kao Corporation). The ease of rinsing of the cosmetic film was visually observed, and removability was evaluated according to the following criteria.

◎: Almost completely removed.
○: Almost removed, but some residue of the composition is observed.
Δ: Partially removed but residue of the composition is noticeable.
x: Not removed.

The results are illustrated in Table 3.

As is clear from the results illustrated in Table 3, it can be seen that the composition in Example 3 using the carboxylic acid modified silicone (A) that is expressed by the above structural formula (1) and is liquid at room temperature (25° C.) is superior to the composition in Comparative Example 5 using no carboxylic acid modified silicone in removability with soap. On the contrary, the composition in Comparative Example 6 using the compound 2 that does not correspond to the carboxylic acid modified silicone (A) and has an a/b of 0/1 in the structural formula (1) exhibited inferior removability with soap. Further, the composition in Comparative Example 7 using polysorbate 60, which is a typical nonionic surfactant, improved removability, but exhibited inferior water resistance.

Specific formulation examples of the composition of the present invention are described below. The blending amount of each component in the table represents "mass %" ("weight %") unless otherwise specified. Note that, in the following formulation examples, in addition to the compound 1 described above, a carboxylic acid modified silicone marketed as the trade name ES-5800 Formulation Aid (manufactured by Dow Toray Co., Ltd.) can be suitably used as the carboxylic acid modified silicone.

Example 4

The formulation of a water-in-oil sunscreen cream (Example 4) is described as an example of an emulsion composition of the present invention.

Water-In-Oil Sunscreen Cream

TABLE 4

|   | Component | Blending amount |
|---|---|---|
| 1 | Sorbitan sesquiisostearate | 1.00 |
| 2 | PEG-9 Polydimethylsiloxyethyldimethicone | 1.00 |
| 3 | Dimethicone (50 mm$^2$/s) | 4.00 |
| 4 | Hydrogen dimethicone treated microparticle titanium oxide | 12.00 |
| 5 | Ethylhexyl palmitate | 5.00 |
| 6 | Disteardimonium hectorite | 1.00 |
| 7 | Lauryl PEG-9 polydimethylsiloxyethyl dimethicone | 1.00 |
| 8 | Cyclopentasiloxane | Remaining amount |
| 9 | Cyclopentasiloxane (and) (acrylates/polytrimethylsiloxy methacrylate) copolymer (polymer concentration 30 mass %) | 0.50 |
| 10 | (Dimethicone/vinyl dimethicone) crosspolymer: dimethicone (25:75) | 1.00 |
| 11 | Methyl methacrylate crosspolymer | 6.00 |
| 12 | Ethylhexyl methoxycinnamate | 9.00 |
| 13 | Ethylhexyl triazone | 1.00 |
| 14 | Diethylaminohydroxybenzoyl hexyl benzoate | 1.00 |
| 15 | Ethylhexyl salicylate | 3.00 |
| 16 | Purified water | 26.70 |
| 17 | Sodium chloride | 1.20 |
| 18 | Butylene glycol | 6.00 |
| 19 | Phenoxyethanol | 0.40 |
| 20 | Concentrated glycerin | 1.50 |
| 21 | Compound 1 | 2.00 |

(Manufacturing Method)
(1) Components 1 to 15 are mixed.
(2) Components 16 to 20 are mixed.
(3) The mixture obtained in the above (1) is added little by little to the mixture obtained in the above (2) at normal room temperature to prepare an emulsion.

(4) A component 21 is mixed with the emulsion obtained in the above (3) to form a water-in-oil sunscreen cream.

Examples 5 to 7: Formulation Examples of Oil-Based Cosmetic Composition

The formulations of a lip gloss (Example 5), an eye shadow (Example 6) and a lipstick (Example 7) are described as examples of the non-emulsion composition of the present invention.

Lip Gloss

TABLE 5

| | Component | Blending amount |
|---|---|---|
| 1 | Polybutene | 50.00 |
| 2 | Diisostearyl malate | 12.50 |
| 3 | Polyglyceryl-2 triisostearate | 4.50 |
| 4 | Triethylhexanoin | 10.00 |
| 5 | (Palmitate/ethylhexanoic acid) dextrin | 4.00 |
| 6 | (Diisostearic acid/hydrogenated rosin acid) glyceryl | 4.00 |
| 7 | Hydrophobicized fumed silica | 1.00 |
| 8 | Triethylhexanoin | Remaining amount |
| 9 | Di (phytosteryl/octyldodecyl) lauroyl glutamate | 2.00 |
| 10 | Pigment (inorganic pigment and organic pigment) | 0.10 |
| 11 | Mica titanium | 0.40 |
| 12 | Ethylhexyl Glycerin | 0.50 |
| 13 | Compound 1 | 2.00 |

(Manufacturing Method)
(1) Components 1 to 6 are heated to 110° C., and mixed and dissolved.
(2) Components 7 to 13 are added to the mixture liquid prepared in the above (1), and are uniformly mixed at 901C.
(3) The mixture liquid prepared in the above (2) in a molten state is filled into a metal container, and then cooled to form a lip gloss.

(Eye Shadow)

TABLE 6

| | Component | Blending amount |
|---|---|---|
| 1 | Diisostearyl malate | Remaining amount |
| 2 | Ethylhexyl palmitate | 10.00 |
| 3 | Polyethylene wax | 7.80 |
| 4 | Triethylhexanoin | 6.70 |
| 5 | Dimer Dilinoleyl Dimer Dilinoleate | 5.80 |
| 6 | Phytosteryl/Isostearyl/cetyl/stearyl/behenyl dimer dilinoleate | 5.00 |
| 7 | Synthetic Wax | 3.50 |
| 8 | Microcrystalline wax | 2.60 |
| 9 | Polybutene | 2.50 |
| 10 | Di (phytosteryl/octyldodecyl) lauroyl glutamate | 2.00 |
| 11 | Glyceryl diisostearate | 1.60 |
| 12 | Candelilla wax | 1.00 |
| 13 | Tocopherol | 0.10 |
| 14 | Mica | 24.00 |
| 15 | Pigment (inorganic pigment, organic pigment) | 4.70 |
| 16 | Compound 1 | 1.00 |

(Manufacturing Method)
(1) Components 1 to 13 are heated to 1100, and mixed and dissolved.
(2) Components 14 to 16 are added to the mixture liquid prepared in the above (1), and are uniformly mixed at 907C.
(3) The mixture liquid prepared in the above (2) in a molten state is filled into a metal container, and then cooled to form an eye shadow.

Lipstick

TABLE 7

| | Component | Blending amount |
|---|---|---|
| 1 | Tocopherol | 0.05 |
| 2 | Ceresin Wax | 5.50 |
| 3 | Polyethylene wax | 7.00 |
| 4 | Candelilla wax | 1.00 |
| 5 | Microcrystalline wax | 1.00 |
| 6 | Vaseline | 1.00 |
| 7 | Polybutene | 10.00 |
| 8 | Castor oil | 10.00 |
| 9 | Triethylhexanoin | 39.00 |
| 10 | Diisostearyl malate | 5.00 |
| 11 | Synthetic Wax | 1.00 |
| 12 | Liquid paraffin | 5.50 |
| 13 | Sorbitan sesquiisostearate | 0.30 |
| 14 | Pigment (inorganic pigment and organic pigment) | 5.60 |
| 15 | Ethylhexyl palmitate | Remaining amount |
| 16 | Silica | 1.00 |
| 17 | Compound 1 | 1.50 |

(Manufacturing Method)
(1) Components i to 11 are heated to 11000, and mixed and dissolved.
(2) Components 12 to 14 are mixed using three rolls.
(3) The mixture liquid prepared in the above (2) and components 15 to 17 are added to the mixture liquid prepared in the above (1), and are uniformly mixed at 90° C.
(4) The mixture liquid prepared in the above (3) in a molten state is filled into a lipstick container, and then cooled to form a lipstick.

(O/W Sunscreen)

TABLE 8

| | Component | Blending amount |
|---|---|---|
| | Phase A | |
| 1 | Ethylhexyl methoxycinnamate | 6 |
| 2 | Ethylhexyl salicylate | 3 |
| 3 | Cetyldiglyceryl tris (trimethylsiloxy) Silylethyldimethicone * | 5 |
| 4 | Alkylate benzoate (C12-15) | 3 |
| 5 | Isohexadecane | 1 |
| 6 | Dimethicone, Dimethicone crosspolymer ** | 3 |
| 7 | Compound 1 | 2 |
| | Phase B | |
| 7 | Cetyl diglyceryl tris (trimethylsiloxy) Silylethyldimethicone * | 1.5 |
| 8 | Hydrophobicized titanium oxide | 6 |
| 9 | Hydrophobicized zinc oxide | 4 |
| 10 | Caprylyl methicone | 7.5 |
| | Phase C | |
| 11 | Glycerin | 5 |
| 12 | Sodium chloride | 1 |
| 13 | Water | Residual |
| 14 | Ethanol | 5 |
| 15 | Phenoxyethanol | 0.9 |

* ES-5600 Silicone Glycerol Emulsifier (manufactured by Dow Toray Co., Ltd.)
** 9041 Silicone Elastomer Blend (manufactured by Dow Toray Co., Ltd.)

(Manufacturing Method)
(1) Components in a phase A are mixed.
(2) Components in a phase B are mixed using three rolls.
(3) Components in a phase C are mixed.
(4) The phase A and the phase B are mixed into an AB phase.
(5) A phase C is gently added while stirring the AB phase to be emulsified.

What is claimed is:

1. A cosmetic composition comprising:
a carboxylic acid modified silicone (A) that is liquid at 25° C. and expressed by the following structural formula (1):

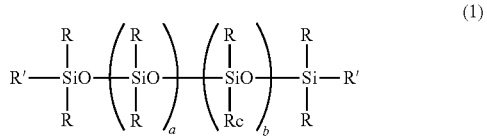

(1)

wherein:
Rc represents a carboxyl group-containing organic group represented by the following general formula: $-R^1-(OR^2)_p-(O)_w-R^3-COOH$ where $R^1$ represents a linear or branched alkylene group having 2 to 22 carbon atoms, $R^2$ is a linear or branched alkylene group having 2 to 4 carbon atoms, $R^3$ represents a bond (—) or a linear or branched alkylene group having 1 to 22 carbon atoms, p represents a number in a range of 0 to 200, and w is 0 or 1, R represents a same or different alkyl or alkoxy group, having 1 to 22 carbon atoms, or a phenyl group,
R' is Rc or R, and
a is a positive number, b is a positive number, a+b is a number in a range of 2 to 20, and a/b is 1; and
an oil agent (B)
wherein
the carboxylic acid modified silicone (A) dissolves in the oil agent (B), and
the cosmetic composition is free from a basic compound such that the cosmetic composition comprises no basic compound.

2. The cosmetic composition according to claim 1, comprising the carboxylic acid modified silicone (A) in a range of 0.1 to 10 mass % of the total mass of the cosmetic composition.

3. The cosmetic composition according to claim 1, comprising the oil agent (B) in a range of 5 to 99 mass % of the total mass of the cosmetic composition.

4. The cosmetic composition according to claim 1, further comprising an oil-soluble film-forming agent (C).

5. The cosmetic composition according to claim 4, further comprising a hydrophobic powder (D).

6. The cosmetic composition according to claim 5, further comprising water (E).

7. The cosmetic composition according to claim 6, further comprising a surfactant (F).

8. The cosmetic composition according to claim 1, further comprising a hydrophobic powder (D).

9. The cosmetic composition according to claim 1, further comprising water (E).

10. The cosmetic composition according to claim 9, wherein the cosmetic composition is a water-in-oil emulsion cosmetic composition.

11. The cosmetic composition according to claim 10, further comprising a surfactant (F).

12. The cosmetic composition according to claim 9, further comprising a surfactant (F).

13. The cosmetic composition according to claim 12, comprising the surfactant (F) in a range of 0.5 to 15 mass % of the total mass of the cosmetic composition.

14. The cosmetic composition according to claim 1, wherein the oily agent (B) comprises at least one ultraviolet light absorbing agent.

15. The cosmetic composition according to claim 1, wherein Rc in the structural formula (1) represents $-(C_nH_{2n})-COOH$ where n represents a number of 3 to 16.

16. The cosmetic composition according to claim 1, wherein Rc in the structural formula (1) represents $-C_{10}H_{20}-COOH$.

17. The cosmetic composition according to claim 16, wherein a is 3, b is 3, and a+b is 6 in the structural formula (1).

* * * * *